US010409496B1

(12) United States Patent
Si et al.

(10) Patent No.: US 10,409,496 B1
(45) Date of Patent: Sep. 10, 2019

(54) WRITE TAGGING FOR SELECTIVE AVOIDANCE OF INLINE COMPRESSION

(71) Applicant: EMC IP Holding Company LLC, Hopkinton, MA (US)

(72) Inventors: Yining Si, Sherborn, MA (US); Philippe Armangau, Acton, MA (US); Yubing Wang, Southborough, MA (US); Christopher A. Seibel, Walpole, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 71 days.

(21) Appl. No.: 15/499,467

(22) Filed: Apr. 27, 2017

(51) Int. Cl.
*G06F 3/06* (2006.01)
(52) U.S. Cl.
CPC .......... *G06F 3/0608* (2013.01); *G06F 3/0631* (2013.01); *G06F 3/0643* (2013.01); *G06F 3/0676* (2013.01)
(58) Field of Classification Search
CPC .... G06F 3/0608; G06F 3/0631; G06F 3/0643; G06F 3/0676
See application file for complete search history.

(56) References Cited

U.S. PATENT DOCUMENTS

| 5,701,516 | A | 12/1997 | Cheng et al. |
| 8,190,850 | B1 | 5/2012 | Davenport et al. |
| 8,996,837 | B1 * | 3/2015 | Bono ............. G06F 3/0614 711/114 |
| 9,400,792 | B1 | 7/2016 | Bono et al. |
| 2005/0148891 | A1 * | 7/2005 | Yamashita ....... A61B 5/0432 600/509 |
| 2017/0212698 | A1 * | 7/2017 | Bhadauria ........ G06F 12/0888 |

OTHER PUBLICATIONS

Yannis Klonatos; Transparent Online Storage Compression at the Block-Level; ACM Transactions on Storage; vol. 8, No. 2, Article 5, Publication date May 2012; 33 pages.

* cited by examiner

*Primary Examiner* — Reginald G Bragdon
*Assistant Examiner* — Edward Wang
(74) *Attorney, Agent, or Firm* — Bainwood Huang

(57) ABSTRACT

A technique for storing data selectively tags write requests received by a data storage system based on whether each write request is directed to a file having a file type on an exclusion list, thereby producing a set of tagged write requests directed to a file type on the exclusion list and a set of untagged write requests directed to a file type not on the exclusion list. The method further includes persistently storing tagged data specified by the set of tagged write requests without first compressing the tagged data, and persistently storing untagged data specified by the set of untagged write requests after compressing the untagged data.

20 Claims, 4 Drawing Sheets

WRITE TAGGING FOR SELECTIVE AVOIDANCE OF INLINE COMPRESSION

BACKGROUND

Data storage systems are arrangements of hardware and software that include storage processors coupled to arrays of non-volatile storage devices, such as magnetic disk drives, electronic flash drives, and/or optical drives, for example. The storage processors service storage requests, arriving from host machines ("hosts"), which specify files or other data elements to be written, read, created, deleted, and so forth. Software running on the storage processors manages incoming storage requests and performs various data processing tasks to organize and secure the data elements stored on the non-volatile storage devices.

Some data storage systems employ data compression to improve storage efficiency. For example, a software program running on a data storage system may read data from disk, compress the data, and write the compressed data back to disk. To read data that has already been compressed, the program may work in the opposite direction, e.g., by fetching compressed data from disk, decompressing the data, and providing the decompressed data.

SUMMARY

Data storage systems that employ compression generally run compression in the background, such as by running a background process or daemon that acts upon already-stored data. Performing compression in the background may result in an over-commitment of storage resources, however, as more storage space than ultimately needed may be used to accommodate initial writes. Also, background compression may entail reading previously-written data from persistent storage and rewriting compressed data back to persistent storage, resulting in a significant increase in disk traffic.

Recent improvements in data storage systems perform data compression in line with storage requests, such that incoming data are compressed prior to the first time they are stored on disk. This arrangement helps to avoid over-commitment of storage resources and to avoid increases in disk traffic.

One issue that can arise with inline compression, however, is that some data are simply not compressible, or are not compressible enough to justify the additional metadata needed to support the persistent storage of the data in compressed form. To account for such uncompressible or slightly compressible data, a data storage system may perform a trial compression on newly-arriving data. If the trial compression shows that the compressed data fails to achieve a minimum level of compression, the data storage system may simply store the newly-arriving data in uncompressed form. In this manner, the data storage system ensures that storage efficiency does not become worse, overall, as a result of performing inline compression.

Unfortunately, such trial compression still consumes valuable computational resources, however. Indeed, performing trial compression is a costly activity, and the computational resources it consumes could be used more efficiently for performing other critical tasks.

In contrast with the above approach, which can excessively consume computational resources in performing trial compressions on uncompressible or slightly compressible data, certain embodiments are directed to a method that selectively tags write requests received by the data storage system based on whether each write request is directed to a file having a file type on an exclusion list, thereby producing a set of tagged write requests directed to a file type on the exclusion list and a set of untagged write requests directed to a file type not on the exclusion list. The method further includes persistently storing tagged data specified by the set of tagged write requests without first compressing the tagged data, and persistently storing untagged data specified by the set of untagged write requests after compressing at least some of the untagged data.

Other embodiments are directed to a data storage system constructed and arranged to perform a method of storing data, such as the method described above. Still other embodiments are directed to a computer program product. The computer program product stores instructions which, when executed by control circuitry of a data storage system, cause the data storage system to perform a method of storing data, such as the method described above.

The foregoing summary is presented for illustrative purposes to assist the reader in readily grasping example features presented herein; however, the foregoing summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

DETAILED DESCRIPTION OF THE INVENTION

Embodiments of the invention will now be described. It should be appreciated that such embodiments are provided by way of example to illustrate certain features and principles of the invention but that the invention hereof is not limited to the particular embodiments described.

An improved technique for storing data in a data storage system maintains an exclusion list that identifies file types found to be uncompressible or slightly compressible and selectively bypasses trial compression for incoming writes directed to file types on the exclusion list. For example, certain file types contain already-compressed data, such that attempts to recompress the data will almost certainly fail to yield an improvement. The improved technique operates on a per-write basis, tagging write requests directed to file types on the exclusion list at one level of processing and reading the tag at another level of processing. The technique stores data from tagged write requests without attempting inline compression and stores data from untagged write requests after performing inline compression.

Figure 1:
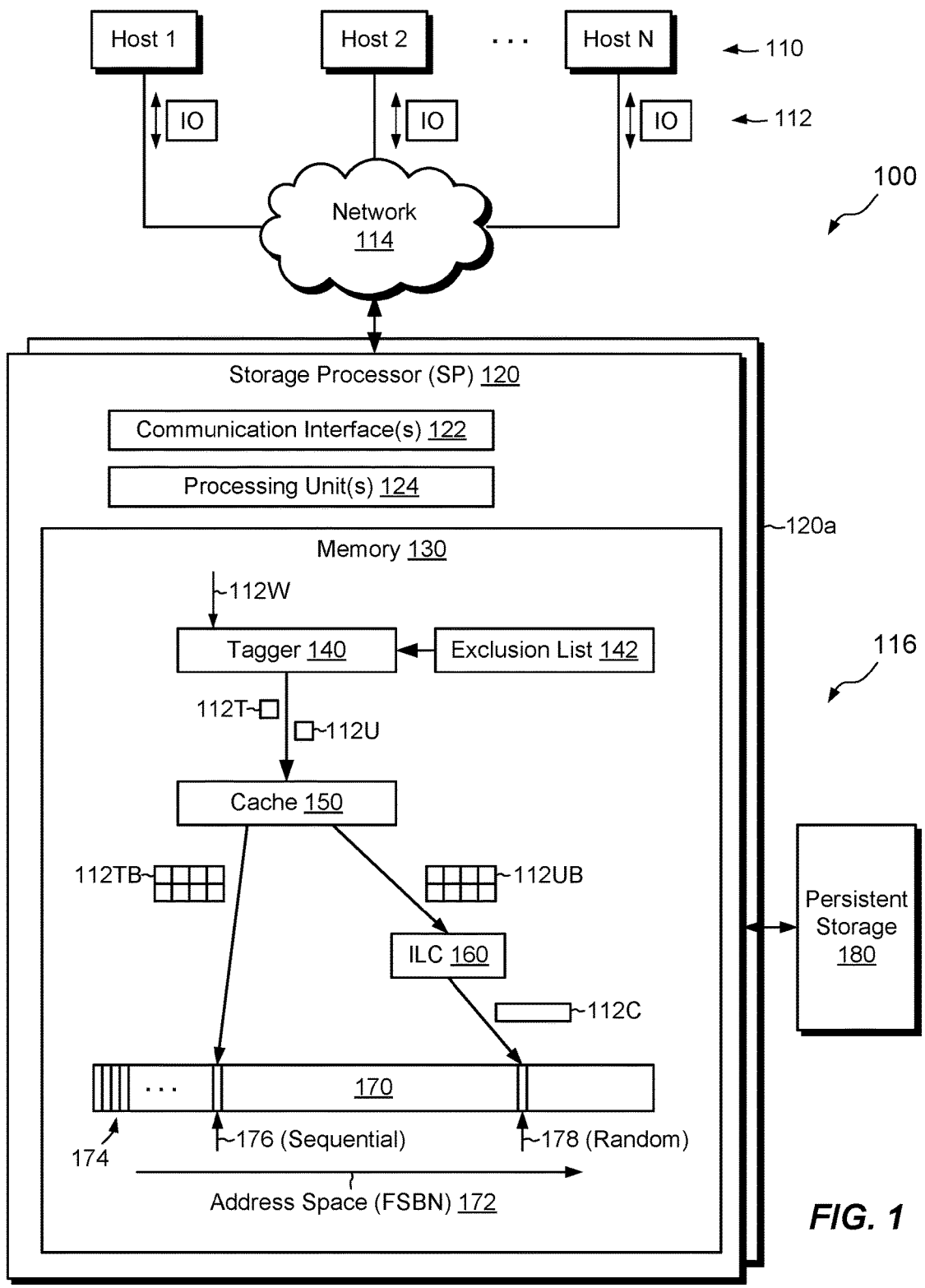
FIG. 1 is a block diagram of an example environment and data storage system in which embodiments of the improved technique hereof can be practiced.

FIG. 1 shows an example environment 100 in which embodiments of the improved technique hereof can be practiced. Here, multiple host computing devices ("hosts") 110 access a data storage system 116 over a network 114. The data storage system 116 includes a storage processor, or "SP," 120 and persistent storage 180, such as magnetic disk drives, electronic flash drives, and the like. The data storage system 116 may include multiple SPs like the SP 120 (e.g., a second SP 120a). In an example, multiple SPs may be provided as circuit board assemblies, or "blades," which plug into a chassis that encloses and cools the SPs. The chassis has a backplane for interconnecting the SPs, and additional connections may be made among SPs using cables. It is understood that no particular hardware configuration is required, however, as any number of SPs may be provided, including a single SP, and the SPs can be any type of computing device capable of processing host IOs.

The network 114 may be any type of network or combination of networks, such as a storage area network (SAN), a local area network (LAN), a wide area network (WAN), the Internet, and/or some other type of network or combination of networks, for example. The hosts 110 may connect to the SP 120 using various technologies, such as Fibre Channel, iSCSI (Internet small computer system interface), NFS (network file system), and CIFS (common Internet file system), for example. Any number of hosts 110 may be provided, using any of the above protocols, some subset thereof, or other protocols besides those shown. As is known, Fibre Channel and iSCSI are block-based protocols, whereas NFS and CIFS are file-based protocols. The SP 120 is configured to receive IO requests 112 according to block-based and/or file-based protocols and to respond to such IO requests 112 by reading or writing the storage 180.

The SP 120 is seen to include one or more communication interfaces 122, a set of processing units 124, and memory 130. The communication interfaces 122 include, for example, SCSI target adapters and network interface adapters for converting electronic and/or optical signals received over the network 114 to electronic form for use by the SP 120. The set of processing units 124 includes one or more processing chips and/or assemblies. In a particular example, the set of processing units 124 includes numerous multi-core CPUs. The memory 130 includes both volatile memory, e.g., RAM (random-access memory), and non-volatile memory, such as one or more ROMs (read-only memory devices), magnetic disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 130 typically includes many other software constructs, which are not shown, such as an operating system, various applications, processes, and daemons.

As further shown in FIG. 1, the memory 130 "includes," i.e., realizes by execution of software instructions, a tagger 140, and exclusion list 142, a cache 150, an inline compressor 160, and a file system 170. The file system 170 arranges data in blocks 174, where a "block" is an allocatable unit of storage, which may be 4 KB, 8 KB, or some other size, which is generally uniform across the file system 170. The file system 170 has a physical address space 172, which ranges, for example from zero to some large number. Each block 174 in the physical address space 172 has an address, which may also be referred to herein as a file system block number, or "FSBN." Although not specifically shown, the file system 170 includes various metadata structures, such as inodes, indirect blocks, virtual block maps, and the like. Such metadata structures may be stored in blocks 174. The file system 170 stores and organizes files and directories, whose data are also stored in blocks 174.

In example operation, hosts 110 issue IO requests 112 to the data storage system 116, such as reads and writes directed to files in the file system 170. The SP 120 receives the IO requests 112 at the communication interfaces 122 and initiates further processing.

The IO requests 112 include write requests 112W, which specify respective data to be stored in the data storage system 116. Tagger 140 selectively tags write requests 112W based on whether the write requests are directed to files in the file system 170 that have file types identified on the exclusion list 142. For example, each write request 112W may specify the file type to which the write request 112W is directed, or the tagger 140 may infer the file type from other content provided with the write request 112W and/or from file system metadata. The tagger 140 checks whether the file type for each write request 112W matches a file type on the exclusion list 142. If the tagger 140 finds a match, the tagger 140 applies a tag, e.g., a flag or other metadata element, to the write request 112W, and passes the write request 112W down an IO stack running on SP 120 as a tagged write request 112T. If the tagger 140 fails to find a match, the tagger 140 passes the write request 112W down the IO stack as an untagged write request 112U.

In an example, the exclusion list 142 is a persistent data structure, backed by the persistent storage 180, which provides identifiers of file types for which data is unlikely to be compressible enough to justify the cost of performing inline compression. These file types may include file types for which data are already compressed to some degree, such as image file types (e.g., JPEG, GIF, TIFF, etc.), video file types (e.g., MP4, MOV, WMV, FLV, AVI, etc.), audio file types (MP3, WAV, AIFF, WMA, etc.), and others. The exclusion list 142 may identify excluded file types by file extension, such as the text that follows the final "." in a file name, and/or by metadata associated with the target file or carried in the write requests 112W themselves. For example, write requests 112W may include metadata, e.g., applied by a host 110 or by intervening software layers, which identifies a file type, either directly or indirectly. The tagger 140 may read such metadata, match the metadata with a file type on the exclusion list 142, and tag write requests 112W associated with file types on the exclusion list 142.

At a lower level of the IO stack, cache 150 receives both write requests 112T and write requests 112U. The cache 150 aggregates tagged write requests 112T and aggregates untagged write requests 112U. For example, cache 150 groups together tagged write requests 112T with other tagged write requests 112T to form tagged batches 112TB, but excludes from such batches any untagged write requests 112U. Likewise, cache 150 groups together untagged write requests 112U with other untagged write requests 112U to form untagged batches 112UB, but excludes from these batches any tagged write requests 112T. Cache 150 then flushes the aggregated batches 112TB and 112UB to the file system 170.

Cache 150 sends each tagged batch 112TB directly to the file system 170, e.g., to be stored within a contiguous range of blocks 174 (with consecutive FSBNs). The file system 170 may create or update mapping metadata (not shown) to incorporate each tagged batch 112TB into a target file.

Cache 150 sends untagged batches 112UB to the file system 170, but with each aggregated batch 112UB first encountering inline compressor 160. The inline compressor 160 performs a trial compression on each aggregated batch 112UB. If each compressed batch 112C meets a specified compression threshold, the inline compressor 160 sends that batch 112C of compressed data to the file system 170, which stores the compressed batch 112C in a contiguous range of blocks 174. However, if the compressed batch fails to meet the compression threshold, the inline compressor 160 instead sends the batch 112UB to the file system 170 in uncompressed form.

In an example, the file system 170 maintains multiple cursors from which it allocates free blocks 174. These include a sequential cursor 176 and a random cursor 178. The file system 170 allocates free space from the sequential cursor 176 for storing sequential data, i.e., consecutive data within a file, and allocates free space from the random cursor 178 for storing data that is not consecutive. In some examples, the file system 170 allocates blocks 174 in windows that include 32, 64, or some other number of consecutive blocks, where the amount of data in each window corresponds to a full stripe in the persistent storage 180, e.g., a full-stripe of a RAID (redundant array of independent disks) batch. In an example, the file system 170 is configured to allocate space for tagged batches 112TB from the sequential cursor 176 and to allocate space for compressed batches 112C of untagged data from the random cursor 178.

In the manner described, the data storage system 116 avoids performing expensive trial compressions on file types for which inline compression is unlikely to be productive. The computational resources that might otherwise be used for inline compression are thus free to be used elsewhere, for performing more critical activities.

Figure 2:
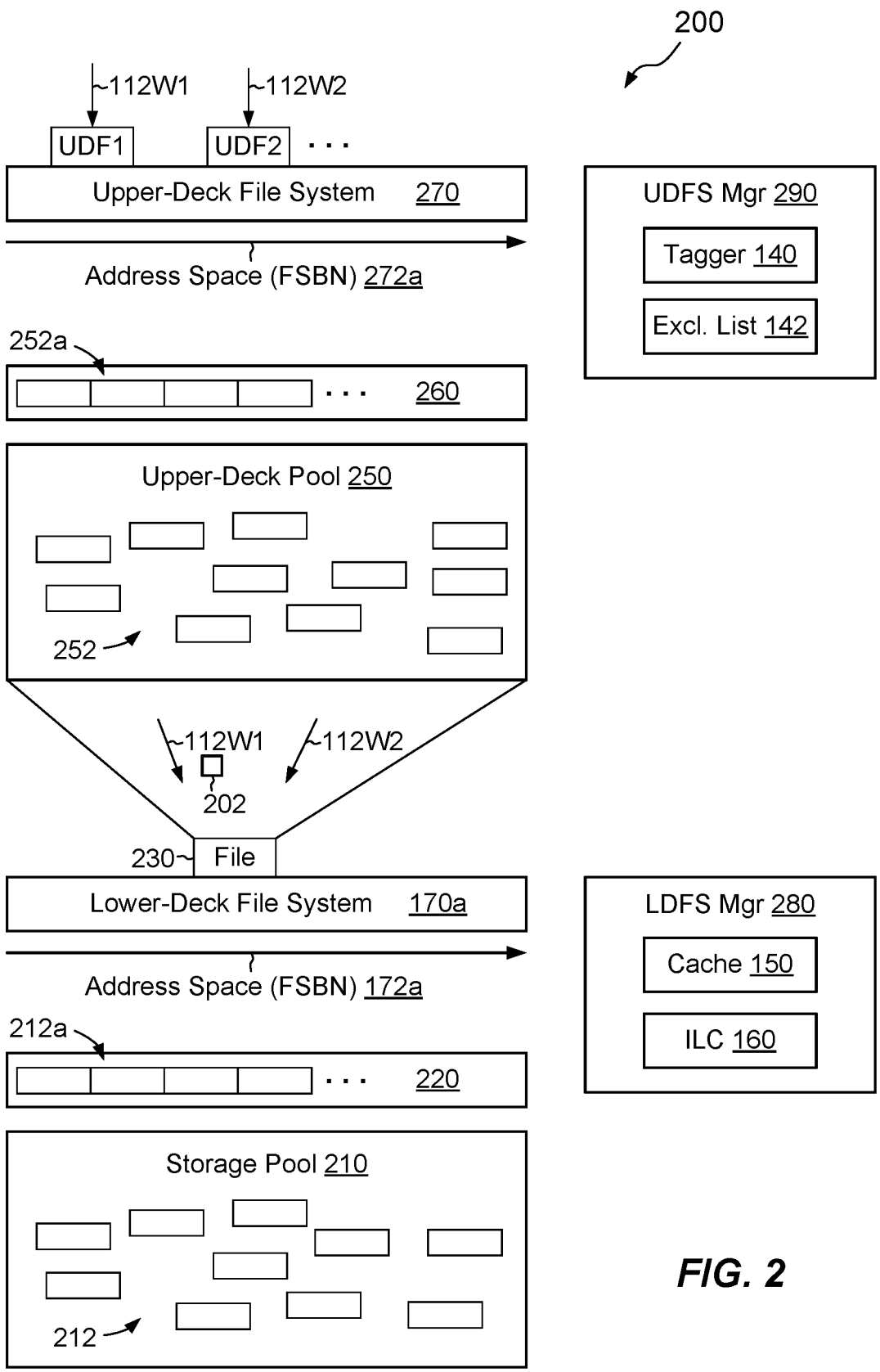
FIG. 2 is block diagram of an example IO stack in the data storage system of FIG. 1.

FIG. 2 shows an example IO stack 200 in greater detail. The example shown in FIG. 2 depicts a particular case in which an upper-deck file system 270 is built upon a single file 230, which resides within a lower-deck file system 170a. Starting at the bottom of FIG. 2, the IO stack 200 includes a storage pool 210, which contains slices 212, where each "slice" is a contiguously-addressable extent of persistent storage. In an example, the data storage system 116 creates slices 212 from RAID groups in the persistent storage 180, e.g. with each slice 212 formed as a number of stripes in a RAID group. Slices 212 are preferably of uniform size, such as 256 MB or 1 GB, for example.

Sparse volume 220 includes multiple provisioned slices 212a. For example, the data storage system 116 provisions slices 212 from the storage pool 210 to the sparse volume 220 on demand, i.e., as additional storage space is needed.

The sparse volume 220 supports the lower-deck file system 170a. For example, lower-deck file system 170a is laid out on the sparse volume 220, with physical addresses 172a in the lower-deck file system 170a corresponding to offsets within the sparse volume 220. Although shown in simplified form, the lower-deck file system 170a should be understood to include both data and metadata. For example, lower-deck file system 170a includes inodes for supporting respective files, indirect blocks for mapping logical addresses of files to corresponding physical addresses 172a, and other metadata structures used for organizing file data. The lower-deck file system 170a is a particular example of the file system 170 of FIG. 1. For example, the lower-deck file system 170a includes blocks, allocation windows, a sequential cursor, and a random cursor, which perform the same roles as described above in connection with file system 170.

File 230 is one of potentially many files in lower-deck file system 170a. The IO stack 200 treats the file 230 in an unusual way, however, by rending the file 230 as a volume and then carving the resulting volume into upper-deck slices 252, which reside in an upper-deck pool 250. The slices 252 are similar to the slices 212 but are derived from the file 220, rather than from RAID groups.

The upper-deck file system 270 is laid out on an upper-deck sparse volume 260. The upper-deck file system 270 has an address space 272a for organizing blocks of the upper-deck file system 270, which may be organized similarly to blocks in the lower-deck file system 170a. Upper-deck sparse volume 260 is similar to sparse volume 220 but contains provisioned slices 252a from the upper-deck pool 250.

In an example, the upper-deck file system 270 is accessible to hosts 110, e.g., via file-based protocols such as NFS or CIFS. Hosts 110 may mount the upper-deck file system 270 and issue IO requests 112 to read and write its contents. The upper-deck file system 270 may include any number of files and directories. Two files, UDF1 and UDF2, are specifically shown. In an example, a host 110 may issue a first write request 112W1 to UDF1 and a second write request to UDF2. Owing to the particular stack-up of structures, the IO stack 200 funnels write requests 112W1 and 112W2 to file 230 within the lower-deck file system 170a. Thus, the IO stack 200 translates each write to any file in the upper-deck file system 270 to a corresponding write to the file 230 in the lower-deck file system 170a.

As further shown in FIG. 2, a lower-deck file system manager 280 manages the lower-deck file system 170a and includes the above-mentioned cache 150 and inline compressor 260. Also, an upper-deck file system manager 290 manages the upper-deck file system 270 and includes the above-mentioned tagger 140 and exclusion list 142.

In operation, the tagger 140 within the upper-deck file system manager 290 selectively applies tags 202 to write requests 112W, based on whether the write requests are directed to files in the upper-deck file system 270 that belong to file types on the exclusion list 142. For example, assume that file UDF1 is an MP4 video file (.mp4) and that file UDF2 is an Excel spreadsheet (.xlsx). Assume further that the MP4 file type is on the exclusion list 142 but that the Excel spreadsheet file type is not. In this case, tagger 140 applies a tag 202 to the write request 112W1 directed to UDF1 but does not apply a tag to write request 112W2 directed to UDF2.

Both write requests 112W1 and 112W2 propagate down the IO stack 200. Lower-deck file system manager 280 receives the write requests into cache 150. In the same manner described in connection with FIG. 1, cache 150 aggregates tagged data with other tagged data, aggregates untagged data with other untagged data, and flushes aggregated data to the lower-deck file system 170a. Tagged aggregated data bypasses inline compressor 160 and is not subject to inline compression. Untagged aggregated data encounter inline compressor 160, where it is subject to trial compression, threshold comparison, and storage in upper-deck file system 170a in either compressed or uncompressed form, depending on the results of the threshold comparison. In this manner, the upper-deck file system manager 290 selectively applies tags 202 and the lower-deck file system manager 280 reads the tags 202 and takes appropriate action.

Figure 3:
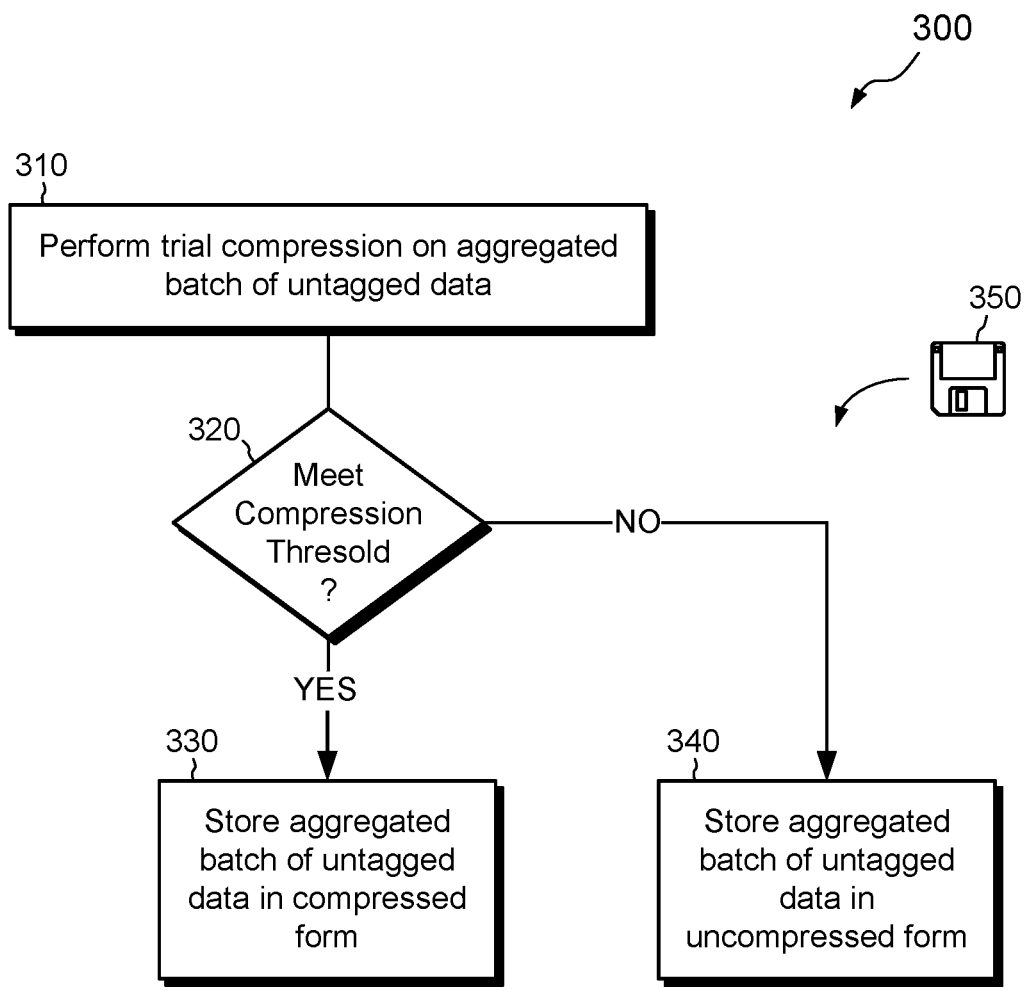
FIG. 3 is a flowchart showing an example compression procedure.
Figure 4:
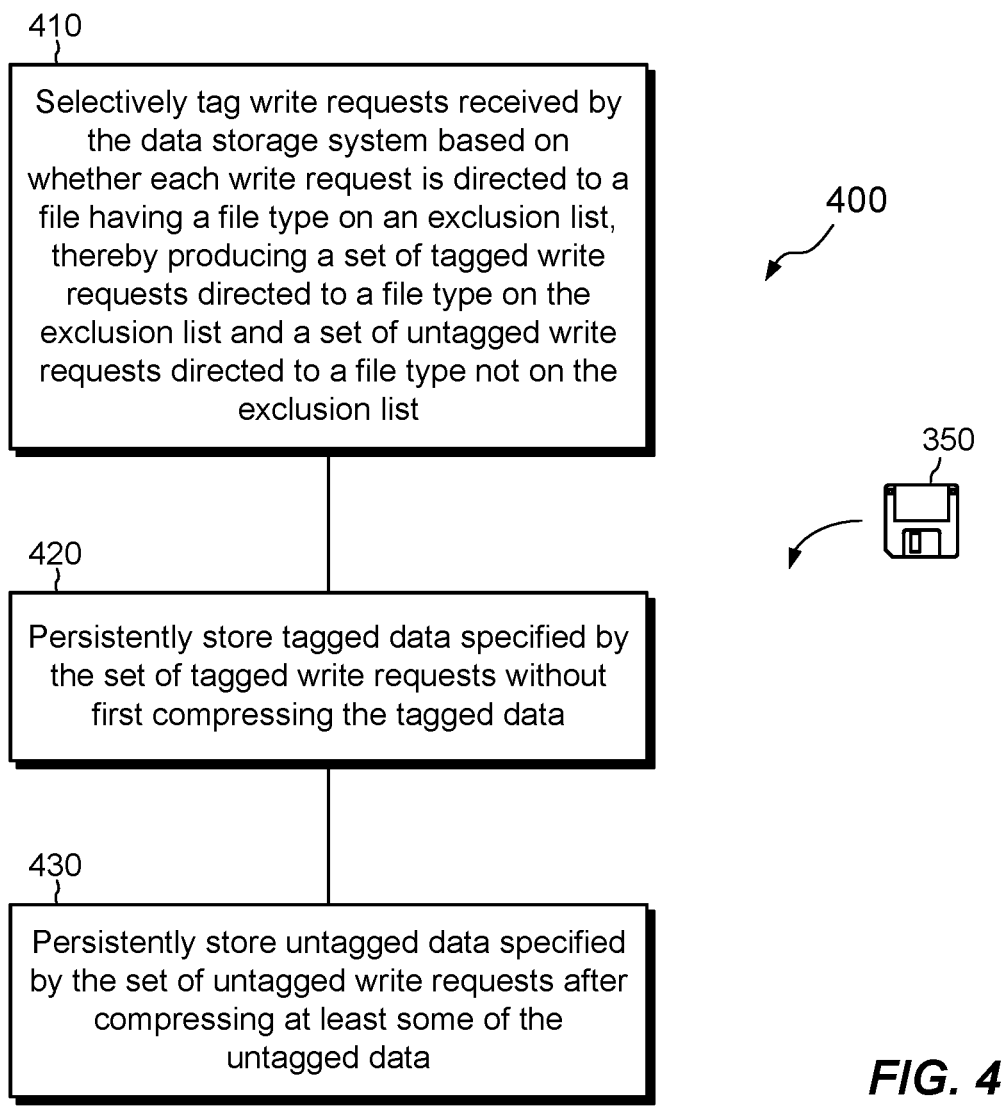
FIG. 4 is a flowchart showing an example method of storing data.

FIGS. 3 and 4 show example methods 300 and 400 that may be carried out in connection with the environment 100. The methods 300 and 400 are typically performed, for example, by the software constructs described in connection with FIGS. 1 and 2, which reside in the memory 130 of the storage processor 120 and are run by the set of processing units 124. The various acts of the methods 300 and 400 may be ordered in any suitable way. Accordingly, embodiments may be constructed in which acts are performed in orders different from those illustrated, which may include performing some acts simultaneously.

FIG. 3 shows an example method 300 of performing in-line compression on untagged aggregated data, such as data 112UB of FIG. 1. At 310, inline compressor 160 performs a trial compression on a batch of aggregated untagged data. For example, cache 150 may aggregate untagged data in batches 112UB, with each batch having a size that matches an integer number of blocks in the file system 170 or 170a.

At 320, inline compressor 160 tests whether the compressed result meets a compression threshold. The threshold may be expressed as a maximum allowable size of resulting data, as a fraction or percentage that indicates a reduction in size, or in any other suitable way. In some examples, inline compressor 160 performs compression on one block-sized increment of data at a time, comparing each compressed block-sized increment with a threshold. If the compressed result fails to meet the threshold, the trial compression may bail out early, before it ever compresses other block-sized increments in the same batch. According to this variant, the threshold may be regarded as a cumulative threshold that increases with each increment in the batch. For example, the threshold may start out as 6 KB for the first increment, then increase to 12 KB for the first and second increments combined, then increase to 18 KB for the first through third increments combined, and so on, with each threshold comparison comparing an accumulated compressed size of the batch with an accumulated threshold. In this case, the threshold comparison at 320 succeeds (produces the "YES" result) when all block-sized increments are compressed and meet the respective thresholds.

At 330, if the threshold comparison succeeds, the inline compressor 160 directs a compressed batch of untagged data to the file system 170 or 170a for storage. Otherwise, at 340, the inline compressor 160 directs an uncompressed batch of untagged data to the file system 170 or 170a.

FIG. 4 shows an example method 400 of storing data in a data storage system 116 and provides a summary of some of the operations described above.

At 410, write requests 112W received by the data storage system 116 are selectively tagged based on whether each write request 112W is directed to a file having a file type on an exclusion list 142, thereby producing a set of tagged write requests 112T directed to a file type on the exclusion list 142 and a set of untagged write requests 112U directed to a file type not on the exclusion list 142.

At 420, tagged data specified by the set of tagged write requests 112T are persistently stored without first compressing the tagged data. For example, the data specified in write requests 112T are aggregated into batches 112TB and stored in windows of allocated space within the file system 170.

At 430, untagged data specified by the set of untagged write requests 112U are persistently stored after compressing at least some of the untagged data. For example, cache 150 aggregates untagged write requests 112U and inline compressor 160 subjects aggregated batches 112UB to trial compression, which may bail out early or may run to completion.

An improved technique has been described for storing data in a data storage system 116. The technique maintains an exclusion list 142 that identifies file types found to be uncompressible or only slightly compressible and selectively bypasses trial compression for incoming writes directed to file types on the exclusion list 142. The improved technique operates on a per-write basis, tagging write requests 112W directed to file types on the exclusion list 142 at one level of processing and reading the tag 202 at another level of processing. The technique stores data from tagged write requests 112T without attempting inline compression and stores data from untagged write requests 112U after performing inline compression on at least some of the untagged data.

Having described certain embodiments, numerous alternative embodiments or variations can be made. For example, the tagger 140 may apply tags 202 based on factors other than matching file types to an exclusion list 142. For example, hosts 110 or other software layers may attach metadata to write requests, which the tagger 140 interprets as indicating that compression of the associated data should be avoided. Upon receiving such write requests, tagger 140 may apply a tag 202 to the write requests, regardless of any matching to file types on the exclusion list 142. A common use for this sort of tagging arises with storage heartbeat signals. For example, a host 110 or other requestor may issue a write request of a small amount of data, such as a single sector (512 bytes). The purpose of this write is to test whether the data storage system 116 is working properly and that the addressed storage object is functioning. An acknowledgement of success in response to the write request confirms proper operation back to the requestor. Requestors may value rapid response times to these small writes, such that delays accompanying inline compression would slow down their operation. However, by applying metadata that the tagger 140 can interpret as a directive to apply a tag 202 to avoid compression, the small writes can propagate quickly through the IO stack 200 and corresponding acknowledgements can propagate quickly back to the requestor. Thus, even if the data specified in small writes would ordinarily be compressed, compression can still be avoided as desired on a per write basis.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 350 in FIGS. 3 and 4). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of storing data in a data storage system, the method comprising:
   selectively tagging write requests received by the data storage system based on whether each write request is directed to a file having a file type on an exclusion list, thereby producing a set of tagged write requests directed to a file type on the exclusion list and a set of untagged write requests directed to a file type not on the exclusion list;
   persistently storing tagged data specified by the set of tagged write requests without first compressing the tagged data; and
   persistently storing untagged data specified by the set of untagged write requests after compressing at least some of the untagged data,
   wherein selectively tagging write requests is performed by a manager of an upper-deck file system, the upper-deck file system built upon a single file within a lower-deck file system,
   wherein the lower-deck file system allocates storage for accommodating writes from an address space, the lower-deck file system maintaining a first cursor pointing to a first address in the address space from which the lower-deck file system allocates storage space for sequential data and maintaining a second cursor pointing to a second address in the address space from which the lower-deck file system allocates storage space for random data, and
   wherein the method further comprises allocating, by the lower-deck file system, storage space for aggregated batches of tagged data from the first cursor but not from the second cursor.

2. The method of claim 1, further comprising specifying each file type on the exclusion list based on at least one of (i) a file extension of the file type and (ii) other file metadata specific to file type.

3. The method of claim 1, further comprising:
   prior to selectively tagging the write requests, receiving the write requests by the data storage system,
   wherein, when persistently storing the untagged data, the untagged data have not been previously persistently stored in the data storage system, such that persistently storing the untagged data effects a first persistent storage of the untagged data in the data storage system.

4. The method of claim 3, wherein selectively tagging write requests is performed by a tagger that operates at a first level of an IO stack in the data storage system, and wherein the method further comprises:
   passing a set of the write requests, including both tagged and untagged write requests, from the first level of the IO stack to a second level of the IO stack;
   at the second level of the IO stack, separating the tagged write requests from the untagged write requests.

5. The method of claim 2, wherein one file type listed on the exclusion list is a video file type.

6. The method of claim 2,
   wherein the data storage system translates write requests directed to different files of the upper-deck file system to write requests to the single file within the lower-deck file system.

7. The method of claim 6, wherein each write request propagates from the upper-deck file system to the lower-deck file system, and wherein the method further comprises:
   testing, by a manager of the lower-deck file system, each write request to determine whether that write request is tagged or untagged;
   aggregating, by the manager of the lower-deck file system, tagged data into aggregated batches of tagged data that exclude untagged data; and
   aggregating, by the manager of the lower-deck file system, untagged data into aggregated batches of untagged data that exclude tagged data;
   wherein persistently storing the tagged data includes persistently storing the tagged data as the aggregated batches of tagged data, and
   wherein persistently storing the untagged data includes (i) performing a trial compression on the aggregated batches of untagged data (ii) selectively storing a first aggregated batch of untagged data in compressed form in response to that aggregated batch of untagged data meeting a compression threshold, and (ii) selectively storing a second aggregated batch of untagged data in uncompressed form in response to that aggregated batch of untagged data failing to meet the compression threshold.

8. The method of claim 2, further comprising:
   receiving a write request specifying data to be written in the data storage system;
   reading metadata accompanying the write request, the metadata providing a directive not to compress the data specified in the write request; and
   in response to reading the metadata, tagging the write request such that the data specified in the write request is not compressed prior to being stored in the persistent storage.

9. The method of claim 8, wherein the write request is a single-sector write request received as a heartbeat signal for determining whether the data storage system is functioning.

10. A data storage system, comprising control circuitry that includes a set of processing units coupled to memory, the control circuitry constructed and arranged to:
    selectively tag write requests received by the data storage system based on whether each write request is directed to a file having a file type on an exclusion list, thereby producing a set of tagged write requests directed to a file type on the exclusion list and a set of untagged write requests directed to a file type not on the exclusion list;

persistently store tagged data specified by the set of tagged write requests without first compressing the tagged data; and persistently store untagged data specified by the set of untagged write requests after compressing at least some of the untagged data, wherein the control circuitry constructed and arranged to selectively tag write requests is part of a manager of an upper-deck file system, the upper-deck file system built upon a single file within a lower-deck file system, wherein the lower-deck file system is configured to allocate storage for accommodating writes from an address space, to maintain a first cursor pointing to a first address in the address space from which the lower-deck file system allocates storage space for a sequential data, and to maintain a second cursor pointing to a second address in the address space from which the lower-deck file system allocates storage space for random data, and wherein the control circuitry is further constructed and arranged to allocate, by the lower-deck file system, storage space for aggregated batches of tagged data from the first cursor but not from the second cursor.

11. The data storage system of claim 10, wherein the control circuitry is further constructed and arranged to specify each file type on the exclusion list based on at least one of (i) a file extension of the file type and (ii) other file metadata specific to file type.

12. The data storage system of claim 11,
wherein the control circuitry is further constructed and arranged to translate write requests directed to different files of the upper-deck file system to write requests to the single file within the lower-deck file system.

13. The data storage system of claim 12, wherein the control circuitry is constructed and arranged to propagate the write request from the upper-deck file system to the lower-deck file system, and wherein the control circuitry is further constructed and arranged to:

test, by a manager of the lower-deck file system, each write request to determine whether that write request is tagged or untagged;

aggregate, by the manager of the lower-deck file system, tagged data into aggregated batches of tagged data that exclude untagged data; and aggregate, by the manager of the lower-deck file system, untagged data into aggregated batches of untagged data that exclude tagged data;

wherein the control circuitry, constructed and arranged to persistently store the tagged data is constructed and arranged to persistently store the tagged data as the aggregated batches of tagged data, and wherein the control circuitry, constructed and arranged to persistently store the untagged data, is constructed and arranged to (i) perform a trial compression on the aggregated batches of untagged data (ii) selectively store a first aggregated batch of untagged data in compressed form in response to that aggregated batch of untagged data meeting a compression threshold, and (ii) selectively store a second aggregated batch of untagged data in uncompressed form in response to that aggregated batch of untagged data failing to meet the compression threshold.

14. A computer program product including a set of non-transitory, computer-readable media having instructions which, when executed by control circuitry of a data storage system, cause the control circuitry to perform a method of storing data, the method comprising:

selectively tagging write requests received by the data storage system based on whether each write request is directed to a file having a file type on an exclusion list, thereby producing a set of tagged write requests directed to a file type on the exclusion list and a set of untagged write requests directed to a file type not on the exclusion list;

persistently storing tagged data specified by the set of tagged write requests without first compressing the tagged data; and persistently storing untagged data specified by the set of untagged write requests after compressing at least some of the untagged data, wherein selectively tagging write requests is performed by a manager of an upper-deck file system, the upper-deck file system built upon a single file within a lower-deck file system, wherein the lower-deck file system allocates storage for accommodating writes from an address space, the lower-deck file system maintaining a first cursor pointing to a first address in the address space from which the lower-deck file system allocates storage space for sequential data and maintaining a second cursor pointing to a second address in the address space from which the lower-deck file system allocates storage space for random data, and wherein the method further comprises allocating, by the lower-deck file system, storage space for aggregated batches of tagged data from the first cursor but not from the second cursor.

15. The computer program product of claim 14, wherein the method further comprises specifying each file type on the exclusion list based on at least one of (i) a file extension of the file type and (ii) other file metadata specific to file type.

16. The computer program product of claim 15, wherein one file type listed on the exclusion list is a video file type.

17. The computer program product of claim 15,
wherein the data storage system translates write requests directed to different files of the upper-deck file system to write requests to the single file within the lower-deck file system.

18. The computer program product of claim 17, wherein each write request propagates from the upper-deck file system to the lower-deck file system, and wherein the method further comprises:

testing, by a manager of the lower-deck file system, each write request to determine whether that write request is tagged or untagged;

aggregating, by the manager of the lower-deck file system, tagged data into aggregated batches of tagged data that exclude untagged data; and aggregating, by the manager of the lower-deck file system, untagged data into aggregated batches of untagged data that exclude tagged data;

wherein persistently storing the tagged data includes persistently storing the tagged data as the aggregated batches of tagged data, and wherein persistently storing the untagged data includes (i) performing a trial compression on the aggregated batches of untagged data (ii) selectively storing a first aggregated batch of untagged data in compressed form in response to that aggregated batch of untagged data meeting a compression threshold, and (ii) selectively storing a second aggregated batch of untagged data in uncompressed form in response to that aggregated batch of untagged data failing to meet the compression threshold.

19. The method of claim 15, wherein the method further comprises:
   receiving a write request specifying data to be written in the data storage system;
   reading metadata accompanying the write request, the metadata providing a directive not to compress the data specified in the write request; and
   in response to reading the metadata, tagging the write request such that the data specified in the write request is not compressed prior to being stored in the persistent storage.

20. The method of claim 19, wherein the write request is a single-sector write request received as a heartbeat signal for determining whether the data storage system is functioning.

\* \* \* \* \*